A. H. MADARA.
DEMOUNTABLE RIM.
APPLICATION FILED JULY 8, 1921.
1,427,006.
Patented Aug. 22, 1922.
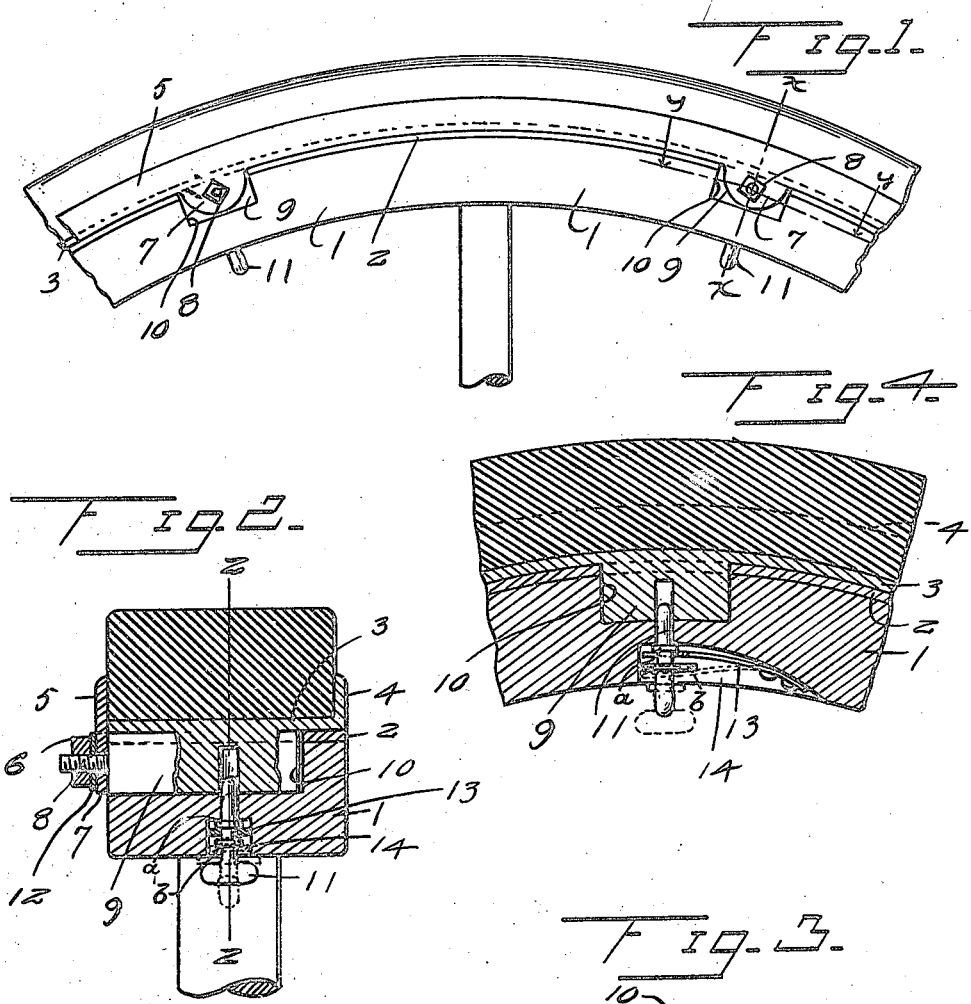
Inventor
A. H. Madara

UNITED STATES PATENT OFFICE.

ALBERT H. MADARA, OF SWEDESBORO, NEW JERSEY.

DEMOUNTABLE RIM.

1,427,006.  Specification of Letters Patent.  Patented Aug. 22, 1922.

Application filed July 8, 1921. Serial No. 483,212.

*To all whom it may concern:*

Be it known that I, ALBERT H. MADARA, a citizen of the United States, residing at Swedesboro, in the county of Gloucester and State of New Jersey, have invented certain new and useful Improvements in Demountable Rims; and I do hereby declare the following to be a full, clear, and exact description of the invention, such as will enable others skilled in the art to which it appertains to make and use the same.

The invention aims to facilitate the placing of rubber or soft tread tires upon rims of vehicle wheels and the ready removal of such tires from the wheels as required.

In accordance with the invention a rim designated to receive the tire is detachably fitted to the rim of the wheel, said demountable rim being constructed to admit of the tire being easily and quickly placed thereon or removed therefrom.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is an elevation of a portion of the rim of a vehicle wheel, illustrating the application of the invention, Figure 2 is a transverse section on the line X—X of Figure 1, the dotted lines showing the rim lock withdrawn and given a one quarter turn to bring the stop thereof in engagement with the felly, to hold the lock in released position, Figure 3 is a cross section on the line Y—Y of Figure 1, and Figure 4 is a sectional detail on the line 2—2 of Figure 2.

Corresponding and like parts are referred to in the following description and designated in the several views of the drawings by like reference characters.

The vehicle wheel comprises the usual wooden rim or felly 1 and felly band 2. The demountable rim is designated by the numeral 3 and is provided at one side with a fixed flange 4. A flange 5 is detachably fitted to the opposite side of the rim 3 and suitable means are provided for securing the flange 5 in position. The felly 1 is provided at intervals in its circumferential length with tapering recesses 10. The detachable flange 5 is provided with apertured ears 7 in coincident relation with the recesses 10 to receive threaded stems 8 whereby to secure the flange 5 to the rim 3 when in operative position thereon.

The rim 3 is provided upon its inner side with tapered lugs 9 which are adapted to enter the correspondingly tapered recesses 10 formed in the outer side of the felly 1. The stems project from the larger ends of the lugs 9 and receive nuts 6 and lock washers 12.

Spring actuated latches 11 are mounted in the felly 1 and their inner ends are adapted to engage openings formed in the tapered lugs 9 to retain the demountable rim 3 in position when placed upon the wheel.

Flat springs 13 cooperate with the latches 11 and normally hold them in engagement with the lugs 9. The springs 13 are seated in recesses 14 formed in the inner side of the felly. The latches 11 constitute locking means to hold the rim 3 on the wheel when in place thereon. The free end of each of the springs 13 is notched to receive the latch 11 which is confined between two stops $a$ and $b$, the stop $b$ being elongated and of a length greater than the width of the recess 14 so as to span the same when the latch 11 is drawn outward and given a one quarter turn and thereby hold the latch clear of the rim lugs 9, as shown by dotted lines in Figures 2 and 4, whereby the rim may be placed in position on the wheel or removed therefrom.

The invention provides a demountable rim for vehicle wheels which may be easily and quickly placed in position or removed from the rim of the wheel and which provides for ready application of a tire thereto or the removal of the tire therefrom. Outward movement of the latches 11 releases the rim 3 which may be drawn from the felly. The tapered lugs 9 and corresponding recesses 10 facilitate the placing of the rim 3 in position on the wheel when assembling the parts.

What is claimed is:—

A vehicle wheel having recesses in the tread side of its felly, a demountable rim provided with lugs fitting the said recesses, latches mounted in the felly and engaging the lugs, flat springs seated in recesses in the felly and engaging the latches to normally hold them projected, and elongated stops carried by the latches and adapted to engage the felly at the sides of the recesses to hold the latches withdrawn to permit the mounting or the dismounting of the rim.

In testimony whereof I affix my signature in presence of two witnesses.

ALBERT H. MADARA.

Witnesses:
F. HANN,
H. D. HANN.